US008250458B2

(12) United States Patent
Jerrard-Dunne et al.

(10) Patent No.: US 8,250,458 B2
(45) Date of Patent: Aug. 21, 2012

(54) METHOD, SYSTEM, AND SOFTWARE TOOL FOR EMULATING A PORTAL APPLICATION

(75) Inventors: Stanley K. Jerrard-Dunne, Dublin (IE); Mark Levins, Dublin (IE); Brendan Murray, Monasterboice (IE); Brian O'Gorman, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1271 days.

(21) Appl. No.: 11/306,424

(22) Filed: Dec. 28, 2005

(65) Prior Publication Data

US 2007/0016696 A1 Jan. 18, 2007

(30) Foreign Application Priority Data

Jun. 30, 2005 (GB) .................................. 0513185.9

(51) Int. Cl.
  *G06F 17/00* (2006.01)
(52) U.S. Cl. ................... 715/209; 715/764; 715/781
(58) Field of Classification Search ................... 715/209
  See application file for complete search history.

(56) References Cited

U.S. PATENT DOCUMENTS

| | | | | |
|---|---|---|---|---|
| 7,114,149 B2* | 9/2006 | Aptus et al. | ................... | 717/123 |
| 7,168,035 B1* | 1/2007 | Bell et al. | ................... | 715/234 |
| 7,448,024 B2* | 11/2008 | Breeden et al. | ................... | 717/125 |
| 2002/0066073 A1* | 5/2002 | Lienhard et al. | ................... | 717/105 |
| 2002/0099738 A1* | 7/2002 | Grant | ................... | 707/513 |
| 2004/0010580 A1* | 1/2004 | Falzon | ................... | 709/223 |
| 2004/0010598 A1* | 1/2004 | Bales et al. | ................... | 709/228 |
| 2004/0098451 A1* | 5/2004 | Mayo | ................... | 709/203 |
| 2004/0117439 A1* | 6/2004 | Levett et al. | ................... | 709/203 |
| 2004/0123238 A1* | 6/2004 | Hefetz et al. | ................... | 715/513 |
| 2005/0097180 A1* | 5/2005 | Abdelhak | ................... | 709/208 |
| 2005/0166188 A1* | 7/2005 | Secrist et al. | ................... | 717/136 |
| 2006/0150144 A1* | 7/2006 | Balathandapani et al. | ... | 717/106 |
| 2006/0168512 A1* | 7/2006 | Wilson et al. | ................... | 715/513 |

* cited by examiner

*Primary Examiner* — Laurie Ries
*Assistant Examiner* — Zaida Marrero
(74) *Attorney, Agent, or Firm* — Cuenot, Forsythe & Kim, LLC

(57) ABSTRACT

A method, system and software tool for emulating a portal application in a rich client application are provided. The rich client application is executable on a client platform capable of displaying views contributed by plug-in components registered with the client platform. The method comprises providing a user interface for eliciting user inputs for creating a new portal application on the client platform, detecting user selection of a portal page layout, and one or more views for each cell of the page layout, and generating a description of a client page representing the portal application. When the rich client application is run on the client platform it is directed to build a client page representing the portal application using the generated description.

21 Claims, 4 Drawing Sheets

METHOD, SYSTEM, AND SOFTWARE TOOL FOR EMULATING A PORTAL APPLICATION

CROSS-REFERENCE TO RELATED APPLICATIONS

This application claims the benefit of United Kingdom Application Serial Number 0513185.9 filed on Jun. 30, 2005, which is fully incorporated herein by reference.

FIELD OF THE INVENTION

The present invention relates to the field of data processing and in particular to creating, editing and emulating a portal application on a rich client platform.

BACKGROUND OF THE INVENTION

The invention relates to rich-desktop client middleware, such as IBM® Workplace™ Client Technology, which moves beyond the browser, enabling not only browser capabilities, but also the ability to securely and incrementally download, update, and intelligently cache the next generation of "rich" and hybrid client applications. These applications run locally on the end user's machine using an encrypted, synchronized content store with security features and offline/disconnected capabilities. Such applications harness the full power of the user's machine to deliver increased capability and performance while continuing to be centrally deployed, upgraded, and administered at the server, side by side with browser-based applications.

The environment in which such client middleware is intended to be used comprises a plurality of centrally managed rich clients and a policy-based client provisioning server, such as a secure enterprise-wide portal. Initial installation of applications as well as maintenance updates can be applied on a managing server and experienced dynamically by users client-side. The applications or updates are automatically provisioned to clients from the managing server under the control of an administrator.

The clients are managed through the use of administration policies defining the capabilities, applications and information, which are available to specific sets of users. For example, a policy called Marketing Group could be configured to define the capabilities that will be supported for users within the enterprise who are defined in that category. Within that policy, an administrator can specify which client applications should be available to those users. For example, an administrator could specify that Mail, Calendar, Document Management, and Discussions applications be dynamically provisioned for the Marketing Group but not a Human Resource application.

The rich client technology works on the basis of concepts first developed for portals for creating component-based Web applications. In a portal, components called portlets generate markup fragments that are aggregated by a portal server into a composite portal page. In a rich client, plug-ins generate views that are built into a client page for display by the rich client. In other words, an application can be represented, on a client platform, in a rich-client-specific presentation layer, by one or more plug-ins; and, on a portal server, in a portal-specific presentation layer, by one or more portlets. The client platform and the portal server each have distinct UI implementations but share a common layer of logic for accessing service components.

A rich client application is represented by a portal page on the portal server. The portal page has a tabular layout with each cell displaying content provided by a portlet. The configuration for each portlet defines the associated client view. The portlets support a rich client 'markup language' as a markup type and produce a description of the contents and parameters of the associated client view.

Configuration and page assembly by a rich client are driven by the managing portal server. When a user requests a portal page via a rich client, the portal server aggregates the content from those portlets on the requested page to which the user has authorised access into a document in the client-requested type of markup. The portal server then provisions the rich client with this document which describes how the rich client should configure itself and assemble the page. The rich client uses the description to build a page from its view plug-ins.

This process of provisioning a client application by a portal server and the dynamic page assembly process is shown in FIG. 1. The client computer system 8 has installed thereon a rich client 10 comprising Application Manager (AM) 22, update manager 24, page builder 26, RCPML cache 28, and plug-ins 30, and a service request mechanism 32. The portal server 14 has a plurality of portlets P, a portal page aggregator 16 and an update server 18.

When a user 50 wishes to logon, the AM sends 101 the client user's name and password for a pre-established portal account to the portal server for authentication. A sign-on token is passed back 102 to the AM, as the result of a successful logon, for use in subsequent communication with the portal.

On first sign-on the AM will send an HTTP request to the portal server 14 for a list of applications which are available to the user, the request will specify the type of markup required, such as an XML (extensible Markup Language)-based rich client platform markup language (RCPML). The server will return a response listing Uniform Resource Locators (URLs) for use by the rich client to request pages representing rich client applications.

When a user selects a particular application from the list, the AM requests 103 the page from the portal using a URL to the portal page of the selected application. The portal server determines the portlets to which the authenticated user has access and aggregates the markup fragments that those portlets produce according to the page layout. The page aggregator 16 then emits 104 an RCPML document describing the plug-ins/views required to create the requested application page, along with the location at which they may be found and the configuration and layout of the views on the page.

Next, the Application Manager parses the markup received, determines the components required, and if necessary queries 105 the update manager, which is used to retrieve 106, 107 component configuration data sets for any missing or updated components from the update server 18.

When all required components are present, the Page Builder 26 aggregates the views specified in the received markup and renders the client page. Each view/plug-in 30 may connect 108 with services 20, as described in the received markup language document, for access to relevant data. The constructed page 40 is then presented 109 to the end user for interaction.

The client has a local secure data store 34 and an RCPML cache 28. When running in disconnected mode (i.e. offline from the portal server) the client uses this local cache of RCPML pages and previously loaded plug-ins for the applications rather than looking to the server.

Currently, the process to develop a new rich client application and deploy that new application to the portal server is complex, tedious and error prone, and requires that the developer have access to the portal server. Many manual steps are involved before a developer can see an application run, and the developer needs to be connected to the portal server. Referring to FIG. 2, the developer must create 200 Java™ for any new views required for the new application. Then the developer must connect 202 to the portal server, and create 204 a portal page, including installing portlets 206 for each view of the new application into the portal server's registry, and configuring each portlet on the portal page to refer to its associated view. The individual view plug-ins must be exported 208 onto a web server so that rich clients can access them. Then, the developer must launch 210 the rich client platform on a computer system, so that the rich client can be provisioned 212 by the portal server with the new application in client platform markup language. Finally, the rich client builds 212 the client page and the developer can see 214 the new application running. This long tedious process is detrimental to the productivity of a programmer trying to create an application. Also a developer requires an extensive knowledge of the server technologies in order to be able to produce a running application. Moreover, if the developer wishes to modify the new application, for example to change the layout and add views, the developer must reiterate through the steps described in FIG. 2, updating the previously selected page layout 204, creating and configuring portlets 206 for any new views, updating plug-ins on web server 208 and completing steps 210, 212, 214 and 216 to see the updated application running.

The invention aims to address these problems.

SUMMARY OF INVENTION

One aspect of the invention provides a method of emulating a portal application on a client system that includes a client platform executing a rich client application capable of displaying views contributed by plug-in components registered with the client platform. The method comprises providing a user interface for eliciting user inputs for creating a new portal application on the client platform, detecting user selection of a portal page layout, and one or more views for each cell of the page layout, and generating a description of a client page representing the portal application. When the rich client application is run on the client platform it is directed to build a client page representing the portal application using the generated description. This process can take place while the client system is not connected to a server.

The method may also comprise generating, in response to user selection of a portal page layout, a portal application file representing a portal page with the selected layout; and, in response to user selection of a view plug-in for a cell of the page layout, adding corresponding portlet configuration data to the portal application file, the portlet configuration data identifying the selected view plug-in. The step of generating a description of a client page may comprise converting the portal application file into a document in a markup language supported by the rich client application. The rich client application builds the client page using views contributed by plug-ins registered with the client platform.

Another aspect of the invention provides a system for emulating a portal application in a rich client application. The system can function without being connected to a server, and comprises a client platform on which the rich client application is executable and which is capable of displaying views contributed by plug-in components registered with the client platform. The system provides a user interface for eliciting user inputs for creating a new portal application on the client platform and detecting user selection of a portal page layout, and one or more views for each cell of the page layout. The system also comprises a builder component for generating a description of a client page representing the portal application, and an execution component for running a rich client application on the client platform and directing it to build a client page representing the portal application using the generated description.

The system may also include a component for generating, in response to user selection of a portal page layout, a portal application file representing a portal page with the selected layout, and, in response to user selection of a view plug-in for a cell of the page layout, adding corresponding portlet configuration data to the portal application file, said portlet configuration data identifying the selected view plug-in. The builder component generates the description of a client page by converting the portal application file into a document in a markup language supported by the rich client application.

An editor component allows a user to edit the portal application on the client platform and then emulate the edited portal application on the rich client application. Moreover, an export mechanism may be provided which generates a command script executable on a portal server to automatically generate the portal constructs required on the portal server in order to run the portal application.

This allows developers to create, deploy and test new applications on a client platform whilst disconnected from the portal server, to test and modify these new applications with ease, and to export these to the portal server in a few easy steps. The amount of effort, knowledge and time required is significantly reduced.

BRIEF DESCRIPTION OF THE DRAWINGS

Preferred embodiments of the present invention will now be described by way of example only, with reference to the accompanying drawings in which.

DESCRIPTION OF PARTICULAR EMBODIMENTS

The rich client is preferably built as an extension to the Eclipse™ platform, a platform for building operating system-independent integrated development environments and is based on the JAVA runtime (Java and all Java-based trademarks are trademarks of Sun Microsystems Inc.). The rich client platform may, for example, be IBM's Workplace® Client Technology platform which adds extra infrastructure services such as a managed store with security features, policies, accounts, and integration with IBM's WebSphere® portal server, and provides a server-based management system for client updates and administration.

Figure 1:
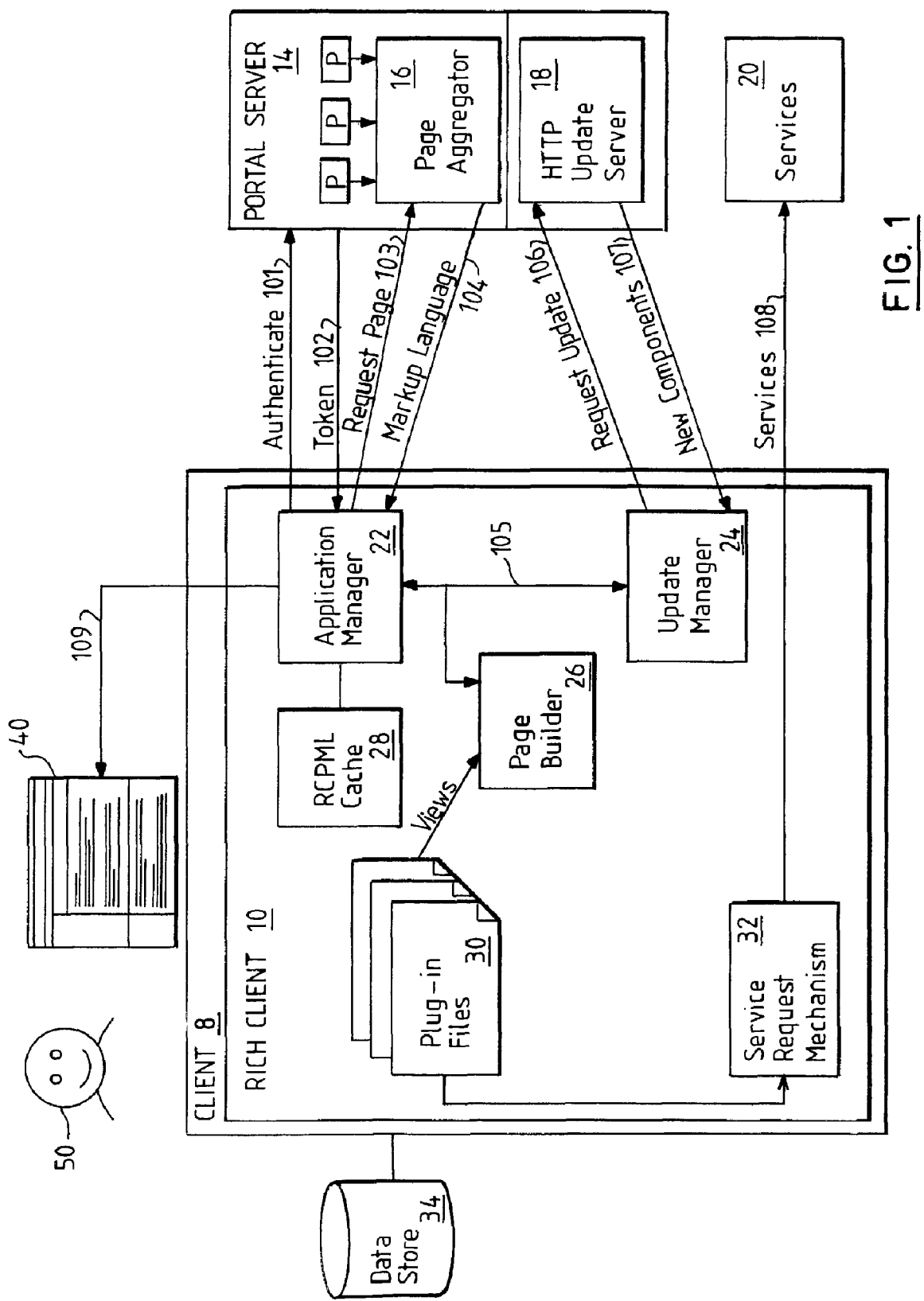
FIG. 1 shows the process of provisioning a rich client application by a portal server and the dynamic page assembly process.
Figure 2:
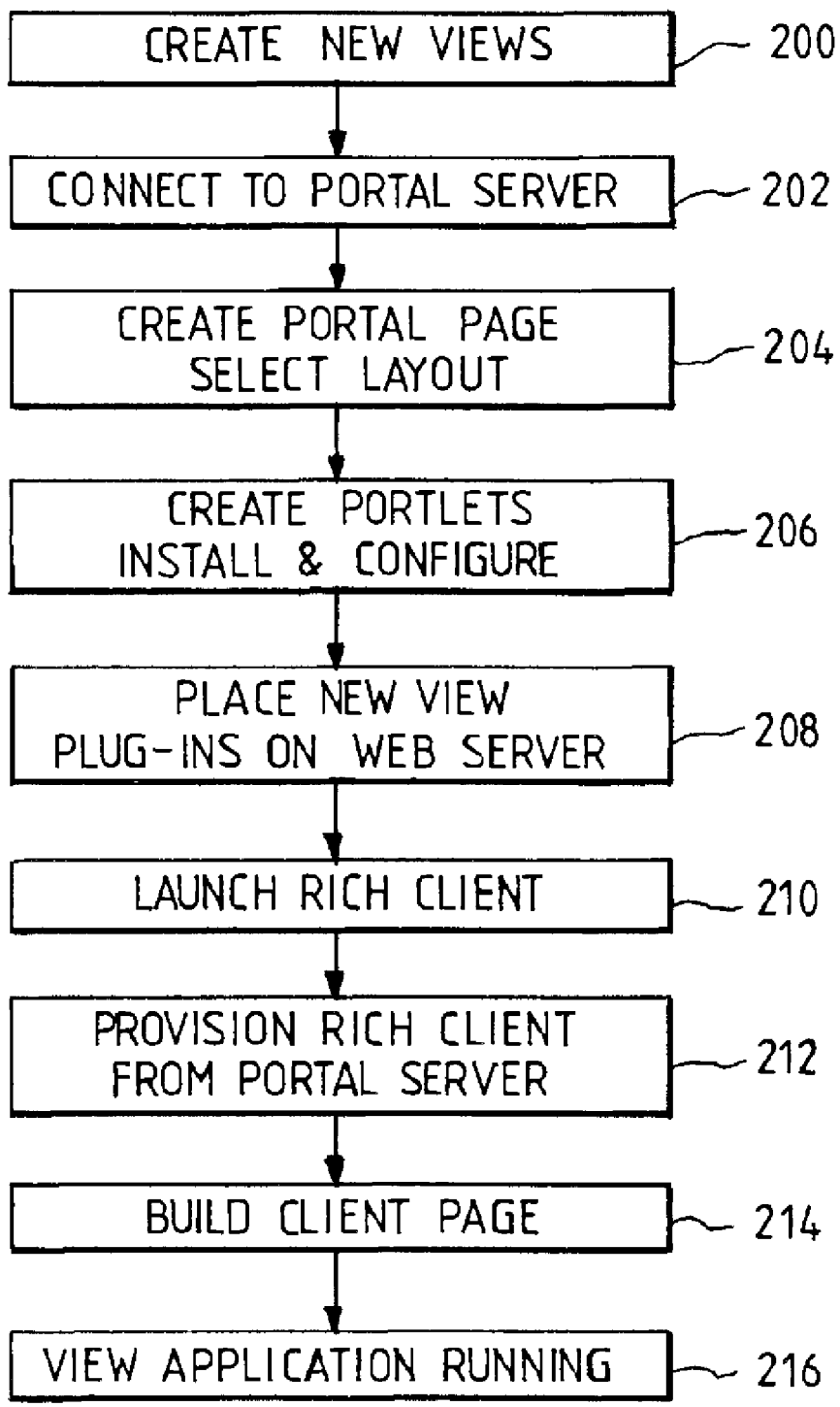
FIG. 2 shows the steps involved in creating a rich client application according to the prior art.
Figure 3:
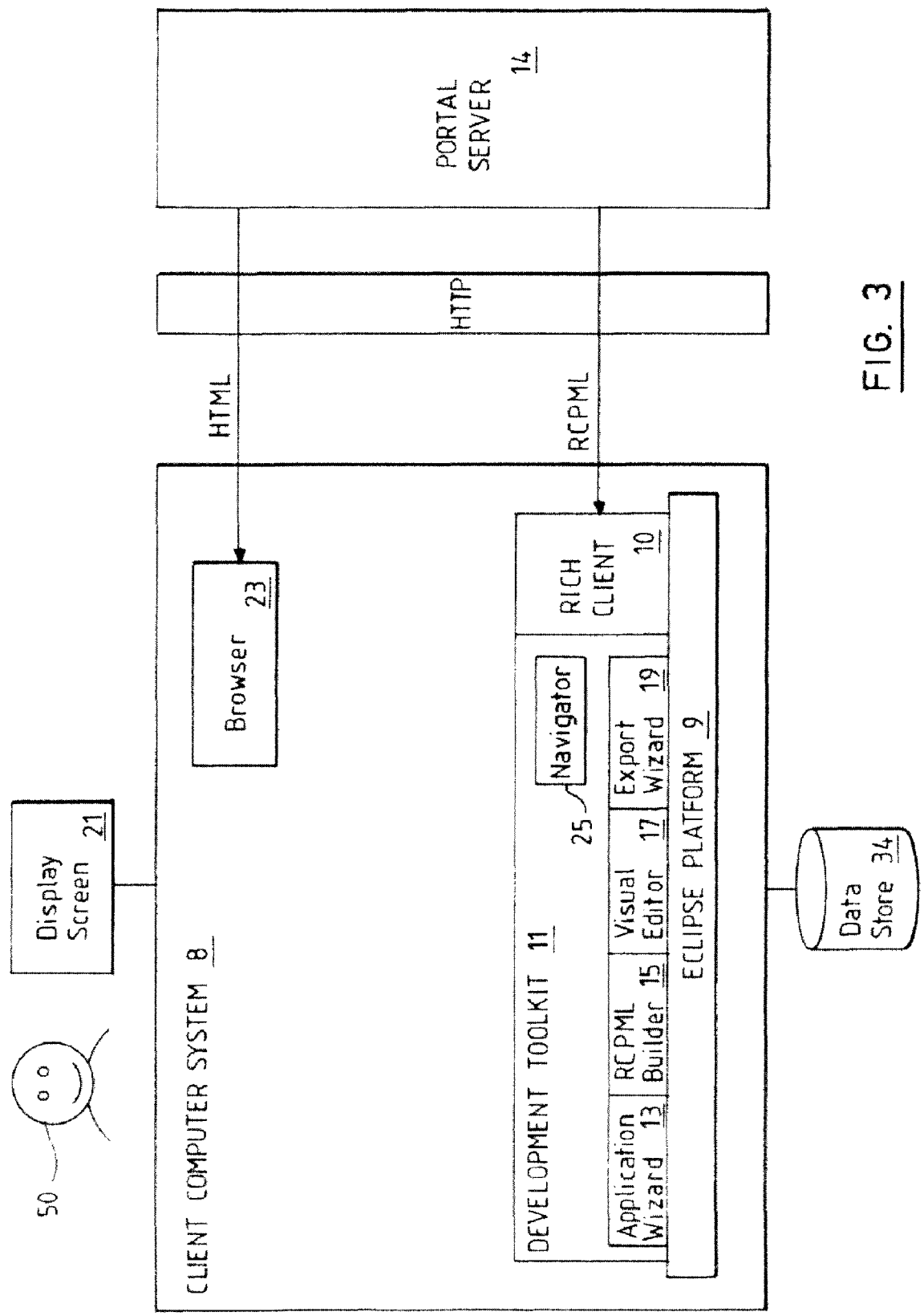
FIG. 3 shows an example of an implementation of a preferred embodiment of the invention.

An example of an architecture in which the invention may be implemented is shown in FIG. 3, in which a client computer system 8 communicates via HTTP (HyperText Transfer Protocol) to a portal server 14. Installed on the client computer system is an Eclipse platform 9, to which a rich client 10 and a development toolkit 111 are provided as extensions.

The development toolkit comprises an application wizard 13, a builder component—RCPML builder 15, an editor component—visual editor 17, a navigator 25, and an export mechanism—wizard 19. The portal server uses portlets which support an XML-based rich client platform markup language (RCPML) to provision the rich client. However, the portlets might also be configured to provide HTML (Hyper Text Markup Language) allowing for a representation of the application on both the browser 23 and on the rich client 10.

The development toolkit enables a developer to create, run and debug an application on a client computer system, even when the terminal is offline from the portal server. Moreover, the toolkit provides an export wizard which generates files for export of the new application to the portal server.

The application wizard enables the developer to design a new portal application. The wizard provides a user interface for eliciting user inputs for the creation of the new application and presents an initial screen which prompts the user to enter some basic information about the new application, including a name for the application project, and to select an icon to represent the application project. The developer is also prompted to select a page layout for the application, either by choosing a page layout from a list of pre-defined layout options or by creating a new page layout using the tool.

For each cell in the selected layout the developer can then select one or more views for each cell within the chosen layout. This selection can comprise: selection of a view the user has already created, and which is thus within the user's ECLIPSE Workbench; creation of one or more new views using the tool to generate code representing the new views; or selection of an external view that already exists elsewhere, either on the client computer system or available on the update server as part of a different rich client application. In ECLIPSE, a view is a plug-in project which contains a view extension.

In the case where multiple views are added to a single cell in the layout, these can either be displayed stacked one above the other or individually selected using a tab bar. Stacking order or tab order is assigned by the developer when adding views to the layout.

Figure 4:
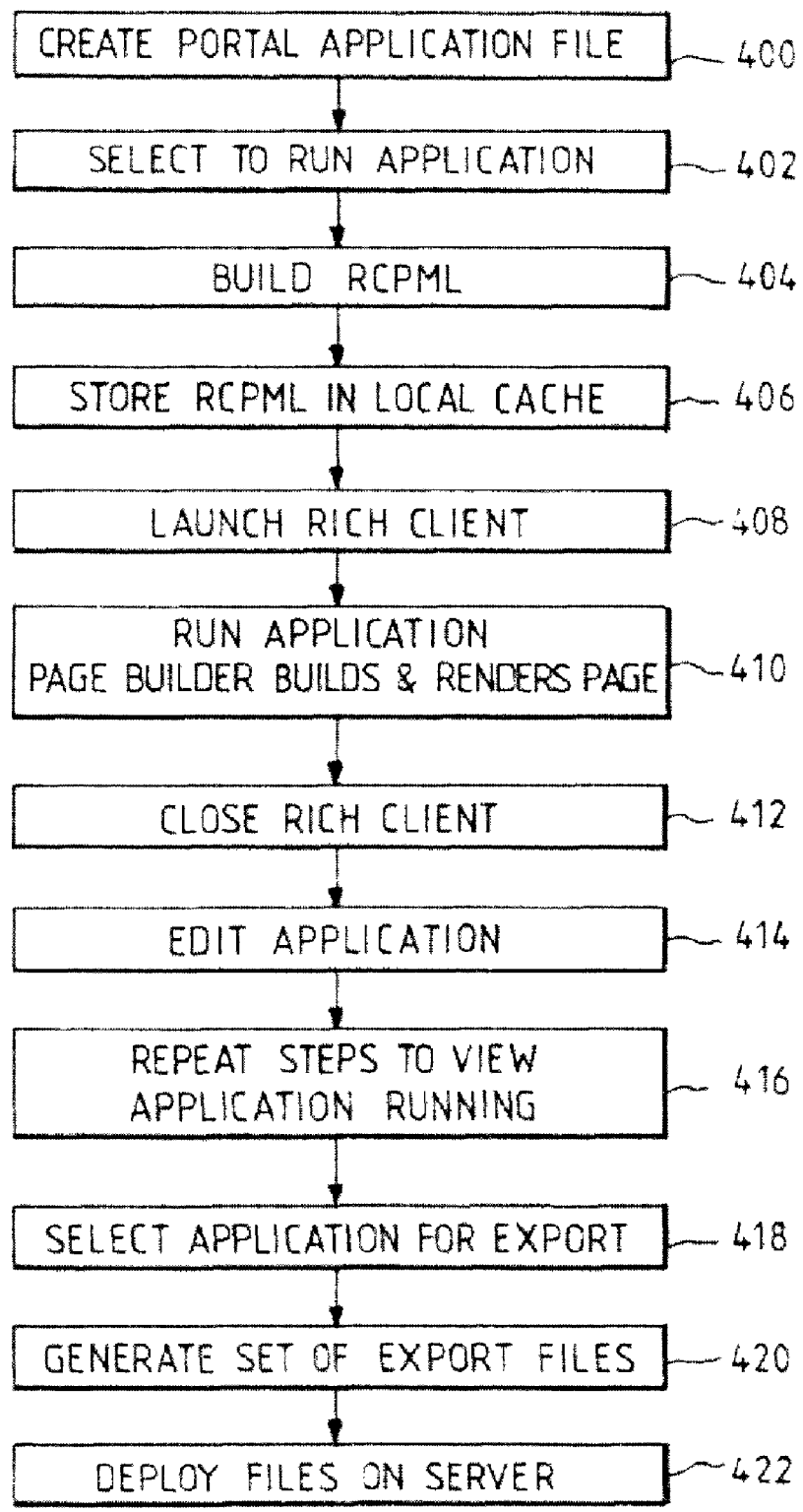
FIG. 4 shows the process of creating, editing and deploying a new application according to an embodiment of the present invention.

Referring to FIG. 4, the wizard generates 400 an XML-based portal application file which describes the portal application. It specifies how the individual components need to be assembled to the complete portal application and defines the portal application topology, layout, and navigation, as well as its resources such as themes and skins, page definitions, portlets, services, etc.

When the user indicates the creation step is finished the wizard creates new ECLIPSE projects representing: the application, the page layout, and the views (one project for each new view), and stores the portal application file.

The application project includes the name and icon associated with the application and acts as a central point for gathering all the plug-ins associated with the new application into a single ECLIPSE feature. The page-layout project defines the format for a display page for the application, typically in terms of rows and columns, which define a number of cells or panes. A view project, i.e. an ECLIPSE View plug-in project, is assigned to each cell in the page layout.

The application navigator 25 provides a contextual display of the application and all its components. It is a view plug-in which groups together the application project with all its associated projects in a hierarchy. The regular view in ECLIPSE would simply show all projects separately in alphabetical order, which can be confusing if there is more than one application in the workspace.

At this stage the developer is able to launch the new application as-is, without having written a single line of code. When the developer chooses 402 to run the application, the RCPML builder 15 converts 404 the stored portal application file describing the portal application into an RCPML file and adds it 406 to the local RCPML cache 28. The rich client is then launched 408 and the user will be asked for rich client logon id and password. The rich client is launched with a command line option directing the rich client to use the specific RCPML cache containing the RCPML built by the RCPML builder. The page builder 26 renders 410 the page according to the built RCPML using the plug-ins available to the rich client. If a plug-in is not available, an error message (such as 'Server unavailable') may appear in its allocated cell rather than the view. In any case, the developer is able to view the application running on the rich client.

For debugging, the rich client is launched with its JVM (JAVA Virtual Machine) running in debug mode. This allows the user to take advantage of the ECLIPSE debugger using normal source level runtime debugging techniques such as breakpoints, step through code and examine variables.

The developer can then close down 412 the rich client and modify 414 the new application using the visual editor component 17 of the development toolkit. The visual editor allows the developer to modify, add or change parameters of views in the application layout. Additionally, it simultaneously shows the developer the JAVA code which is being created for the view plug-in.

The developer can again choose to run the application to see what the application now looks like running on the rich client. So the steps of building RCPML, launching the rich client, viewing the application, closing the rich client and editing the application may be repeated 416 until the developer is happy with the new application.

The developer can then select 418 the export wizard which enables the new application to be exported from the ECLIPSE environment and packaged up for deployment to the managing portal server. The mechanism generates 420 the files required for deploying 422 the new application on the managing portal server, namely: folders containing the new features, images and plug-ins of the application which need to be sent to the update server for provision to other managed clients; an XML script, such as an XML-Access script, which contains a set of program instructions that can be run on the portal server to produce the required portal constructs; a fragment of XML for the contents list on the update server; and a user help file detailing the steps required to deploy the new application using the generated files.

The XML-Access script is generated through conversion of the portal application file, and provides the means to create a portal representation of the application. An advantage of using XML-Access scripts is that in a production environment with several portal server instances for development, staging, quality assurance, and production, the portal administrator can maintain one set of scripts for each installation. The administrator can also make any server dependent changes in the deploy scripts without having to change the base code.

The user help file takes the user step-by-step through the process of deploying the exported set of files on the managing server. It takes users through the following steps:

Step 1: Creating portal pages and portlets to represent the application by running the XML-Access script against the portal server to create the necessary portal pages and portlets representing the application.

Step 2: Making the application features and plug-ins available on the provisioning server by copying the contents of the three folders "features", "plug-ins" and "images" to the corresponding directories on the HTTP server component of the portal server.

Step 3: Adding reference to the application features in the contents list of the HTTP update server using a text editor to add the generated XML fragment to the contents list.

The portal server is then ready to provision any running rich clients with the new application.

The preferred embodiment of the present invention thus provides a toolkit which enables developers to create, run and test new client applications, in a rich client, without the need for access to a portal server. The toolkit also provides a deployment packager which aids a developer in the export of a new application for deployment to the portal server, such that the application can be provisioned to other client devices. This packager transforms the application definition file into a set of program instructions that can be run on the portal server to produce the required portal constructs.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims. For the avoidance of doubt, the term "comprising", as used herein throughout the description and claims is not to be construed as meaning "consisting only of".

What is claimed is:

1. A method of emulating a portal application on a client system that includes a client platform executing a rich client application capable of displaying views contributed by plug-in components registered with the client platform, the method comprising:
    providing a user interface for eliciting user inputs for creating a new portal application on the client platform;
    providing a user interface for eliciting user inputs for creating one or more views for each cell of a page layout, said user interface including an option for generating a new unique view and corresponding code that does not exist elsewhere;
    detecting user selection of the portal page layout, and the one or more views for each cell of the page layout;
    generating a description of a client page representing the portal application;
    running the rich client application on the client platform and directing it to build a client page using the generated description;
    providing a user interface for eliciting user inputs for editing the new portal application on the client platform, wherein said user interface includes a visual editor configured to allow a user to modify, add, and change a parameter of the one or more views, and to simultaneously display program code for the view being manipulated; and
    detecting edits made to the portal application by the user via the user interface that elicits user inputs for editing the new portal application on the client platform;
    wherein said client system is not connected to a server.

2. A method according to claim 1, further comprising:
    in response to user selection of a portal page layout, generating a portal application file representing a portal page with the selected layout; and
    in response to user selection of a view plug-in for a cell of the page layout, adding corresponding portlet configuration data to the portal application file, said portlet configuration data identifying the selected view plug-in.

3. A method according to claim 2, wherein the step of generating a description of a client page comprises converting the portal application file into a document in a markup language supported by the rich client application.

4. A method according to claim 2, further comprising:
    converting the portal application file into a command script which is executable on a portal server to produce portal constructs required by the portal application.

5. A method according to claim 4, further comprising:
    creating a help file for instructing a user to deploy the command script on the portal server.

6. A method according to claim 1, wherein the rich client application builds the client page using views contributed by plug-ins registered with the client platform.

7. A method according to claim 1, further comprising:
    generating a description of a client page representing the edited portal application; and
    running the rich client application on the client platform and directing it to build a client page representing the edited portal application using the generated description.

8. A system for emulating a portal application in a rich client application, the system comprising:
    a client platform configured to display views contributed by plug-in components registered with the client platform;
    a user interface configured to elicit user inputs for creating a new portal application on the client platform and detect a user selection of a portal page layout, and one or more views for each cell of the page layout, wherein:
        said user interface includes an option for generating a new unique view and corresponding code that does not exist elsewhere;
        said user interface elicits user inputs for editing the new portal application on the client platform;
        said user interface includes a visual editor configured to allow a user to modify, add, and change a parameter of the one or more views, and to simultaneously display program code for the view being manipulated; and
        said user interface detects edits made to the portal application by the user via the user interface;

a builder component configured to generate a description of a client page representing the portal application; and an execution component configured to execute the rich client application on the client platform and directing it to build a client page using the generated description, wherein said system is not connected to a server.

9. A system according to claim 8, further comprising:

a component for generating, in response to user selection of a portal page layout, a portal application file representing a portal page with the selected layout, and, in response to user selection of a view plug-in for a cell of the page layout, adding corresponding portlet configuration data to the portal application file, said portlet configuration data identifying the selected view plug-in.

10. A system according to claim 8, wherein the builder component generates the description of a client page by converting the portal application file into a document in a markup language supported by the rich client application.

11. A system according to claim 8, wherein the rich client application comprises a page builder for building the client page using views contributed by plug-ins registered with the client platform.

12. A system according to claim 8, further comprising:

an export mechanism for converting the portal application file into a command script which is executable on a portal server to produce portal constructs required by the portal application.

13. A client system including a client platform for displaying a portal application in a rich client application comprising:

a storage;

an interface means for eliciting user inputs for creating a new portal application on the client platform and detecting user selection of a portal page layout, and one or more views for each cell of the page layout, wherein:

said interface means includes an option for generating a new unique view and corresponding code that does not exist elsewhere;

said interface means elicits user inputs for editing the new portal application on the client platform;

said interface means includes a visual editor configured to allow a user to modify, add, and change a parameter of the one or more views, and to simultaneously display program code for the view being manipulated; and said interface means detects edits made to the portal application by the user via the user interface;

a builder means for generating a description of a client page representing the portal application; and means for displaying the client page, wherein said client system is not connected to a server.

14. The client system according to claim 13, further comprising:

means for generating, in response to user selection of a portal page layout, a portal application file representing a portal page with the selected layout; and means for adding corresponding portlet configuration data to the portal application file in response to user selection of a view plug-in for a cell of the page layout, wherein said portlet configuration data identifies the selected view plug-in.

15. The client system according to claim 13, wherein the builder means generates the description of a client page by converting the portal application file into a document in a markup language supported by the rich client application.

16. The client system according to claim 13, further comprising:

an export means for converting the portal application file into a command script which is executable on a portal server to produce portal constructs required by the portal application.

17. A machine readable storage having stored thereon a computer program having a plurality of code sections for emulating a portal application on a client system that includes a client platform executing a rich client application capable of displaying views contributed by plug-in components registered with the client platform, said machine readable storage comprising:

code for providing a user interface for eliciting user inputs for creating a new portal application on the client platform;

code for providing a user interface for eliciting user inputs for creating one or more views for each cell of a page layout, said user interface including an option for generating a new unique view and corresponding code that does not exist elsewhere;

code for detecting user selection of the portal page layout, and the one or more views for each cell of the page layout;

code for generating a description of a client page representing the portal application; and code for running the rich client application on the client platform and directing it to build a client page using the generated description;

code for providing a user interface for eliciting user inputs for editing the new portal application on the client platform, wherein said user interface includes a visual editor configured to allow a user to modify, add, and change a parameter of the one or more views, and to simultaneously display program code for the view being manipulated; and code for detecting edits made to the portal application by the user via the user interface that elicits user inputs for editing the new portal application on the client platform;

wherein said client system is not connected to a server.

18. The machine readable storage of claim 17, further comprising:

code for, in response to user selection of a portal page layout, generating a portal application file representing a portal page with the selected layout; and code for, in response to user selection of a view plug-in for a cell of the page layout, adding corresponding portlet configuration data to the portal application file, said portlet configuration data identifying the selected view plug-in.

19. The machine readable storage of claim 18, wherein the code for generating a description of a client page comprises code for converting the portal application file into a document in a markup language supported by the rich client application.

20. The machine readable storage of claim 17, wherein the rich client application builds the client page using views contributed by plug-ins registered with the client platform.

21. The machine readable storage of claim 17, further comprising:

code for providing a user interface for eliciting user inputs for editing the new portal application on the client platform; and code for detecting edits made to the portal application by a user.

* * * * *